(12) United States Patent
Kojima

(10) Patent No.: US 12,117,920 B2
(45) Date of Patent: Oct. 15, 2024

(54) ONBOARD ELECTRONIC CONTROL UNIT CONFIGURED TO PERFORM AN OPERATION CHECK

(71) Applicant: Sumitomo Wiring Systems, Ltd., Yokkaichi (JP)

(72) Inventor: Shinya Kojima, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 110 days.

(21) Appl. No.: 17/907,263

(22) PCT Filed: Mar. 12, 2021

(86) PCT No.: PCT/JP2021/010136
§ 371 (c)(1),
(2) Date: Sep. 25, 2022

(87) PCT Pub. No.: WO2021/193154
PCT Pub. Date: Sep. 30, 2021

(65) Prior Publication Data
US 2023/0112759 A1  Apr. 13, 2023

(30) Foreign Application Priority Data

Mar. 26, 2020  (JP) ................................ 2020-056666

(51) Int. Cl.
*G06F 11/36* (2006.01)
*B60R 16/02* (2006.01)

(52) U.S. Cl.
CPC .......... *G06F 11/3608* (2013.01); *B60R 16/02* (2013.01)

(58) Field of Classification Search
CPC ............................ G06F 11/3608; B60R 16/02
See application file for complete search history.

(56) References Cited

U.S. PATENT DOCUMENTS

| 11,868,760 B2* | 1/2024 | Hayashidera ........... H04W 4/44 |
| 11,947,824 B2* | 4/2024 | Mizutani ............... G06F 3/0679 |

(Continued)

FOREIGN PATENT DOCUMENTS

| JP | 2010-113409 A | 5/2010 |
| JP | 2012-174198 A | 9/2012 |

(Continued)

OTHER PUBLICATIONS

International Search Report, Application No. PCT/JP2021/010136, mailed May 18, 2021. ISA/Japan Patent Office.

*Primary Examiner* — Matthew M Kim
*Assistant Examiner* — Indranil Chowdhury
(74) *Attorney, Agent, or Firm* — Honigman LLP

(57) ABSTRACT

Provided is an onboard ECU for controlling an onboard apparatus installed in a vehicle, including a storage unit that stores a control program for controlling the onboard apparatus and an inspection program for performing an operation check of the onboard apparatus or the onboard ECU, and a control unit that executes the control program or the inspection program, the storage unit storing validity information indicating whether the inspection program is valid or invalid being, and the control unit referring to the validity information stored in the storage unit, executing the inspection program if the inspection program is valid, and executing the control program if the inspection program is invalid.

9 Claims, 5 Drawing Sheets

(56) References Cited

U.S. PATENT DOCUMENTS

| | | | |
|---|---|---|---|
| 2019/0258469 A1* | 8/2019 | Hayashidera | G06F 8/65 |
| 2021/0191661 A1* | 6/2021 | Harata | G06F 16/23 |
| 2021/0255845 A1* | 8/2021 | Itatsu | G06F 8/65 |
| 2021/0397433 A1* | 12/2021 | Itatsu | H04W 4/44 |
| 2022/0063646 A1* | 3/2022 | Ishikawa | G06F 8/656 |
| 2022/0126770 A1* | 4/2022 | Itatsu | B60R 16/0234 |
| 2022/0206909 A1* | 6/2022 | Ishikawa | G06F 11/2028 |
| 2022/0244945 A1* | 8/2022 | Hayashidera | H04L 67/34 |
| 2022/0413832 A1* | 12/2022 | Itatsu | G06F 8/65 |
| 2023/0195445 A1* | 6/2023 | Ashibe | G06F 8/65 |
| | | | 717/168 |
| 2023/0259354 A1* | 8/2023 | Tomokuni | G07C 5/008 |
| | | | 717/168 |
| 2023/0409316 A1* | 12/2023 | Aiba | B60R 16/02 |

FOREIGN PATENT DOCUMENTS

| | | | | |
|---|---|---|---|---|
| JP | 2013-121730 A | 6/2013 | | |
| JP | 2017-224926 A | 12/2017 | | |
| WO | WO-2020170926 A1 * | 8/2020 | ......... | B60R 16/0234 |
| WO | WO-2021095498 A1 * | 5/2021 | | |

* cited by examiner

ONBOARD ELECTRONIC CONTROL UNIT CONFIGURED TO PERFORM AN OPERATION CHECK

CROSS-REFERENCE TO RELATED APPLICATIONS

This application is the U.S. national stage of PCT/JP2021/010136 filed on Mar. 12, 2021, which claims priority of Japanese Patent Application No. JP 2020-056666 filed on Mar. 26, 2020, the contents of which are incorporated herein.

TECHNICAL FIELD

The present disclosure relates to an onboard ECU, a program, and an information processing method.

BACKGROUND

Vehicles are installed with body ECUs. Body ECUs are onboard ECUs that perform overall control of body-related apparatuses, such as a wiper drive apparatus, lighting apparatuses inside and outside the vehicle, a door lock apparatus, power windows, and the like (see JP 2017-224926A, for example). The wiper drive apparatus in JP 2017-224926A includes an onboard ECU (body ECU), and is driven by a control program applied to the onboard ECU.

The onboard ECU of JP 2017-224926A has a problem in that no consideration was given to an inspection program for performing an operation check and the like of the wiper drive apparatus that includes this onboard ECU.

An object of the present disclosure is to provide an onboard ECU and the like that can efficiently use an inspection program for performing an operation check of an apparatus that includes this onboard ECU.

SUMMARY

An onboard ECU according to an aspect of the present disclosure is an onboard ECU for controlling an onboard apparatus installed in a vehicle, including a storage unit configured to store a control program for controlling the onboard apparatus and an inspection program for performing an operation check of the onboard apparatus or the onboard ECU, and a control unit configured to execute the control program or the inspection program, the storage unit storing validity information indicating whether the inspection program is valid or invalid, and the control unit referring to the validity information stored in the storage unit, executing the inspection program if the inspection program is valid, and executing the control program if the inspection program is invalid.

Advantageous Effects of Present Disclosure

According to one aspect of the present disclosure, it is possible to provide an onboard ECU and the like that efficiently use an inspection program for performing an operation check of an apparatus that includes this onboard ECU.

BRIEF DESCRIPTION OF THE DRAWINGS

FIG. 2 is a block diagram illustrating an example of an internal configuration of the onboard ECU and the like.

DETAILED DESCRIPTION OF PREFERRED EMBODIMENTS

Figure 1:
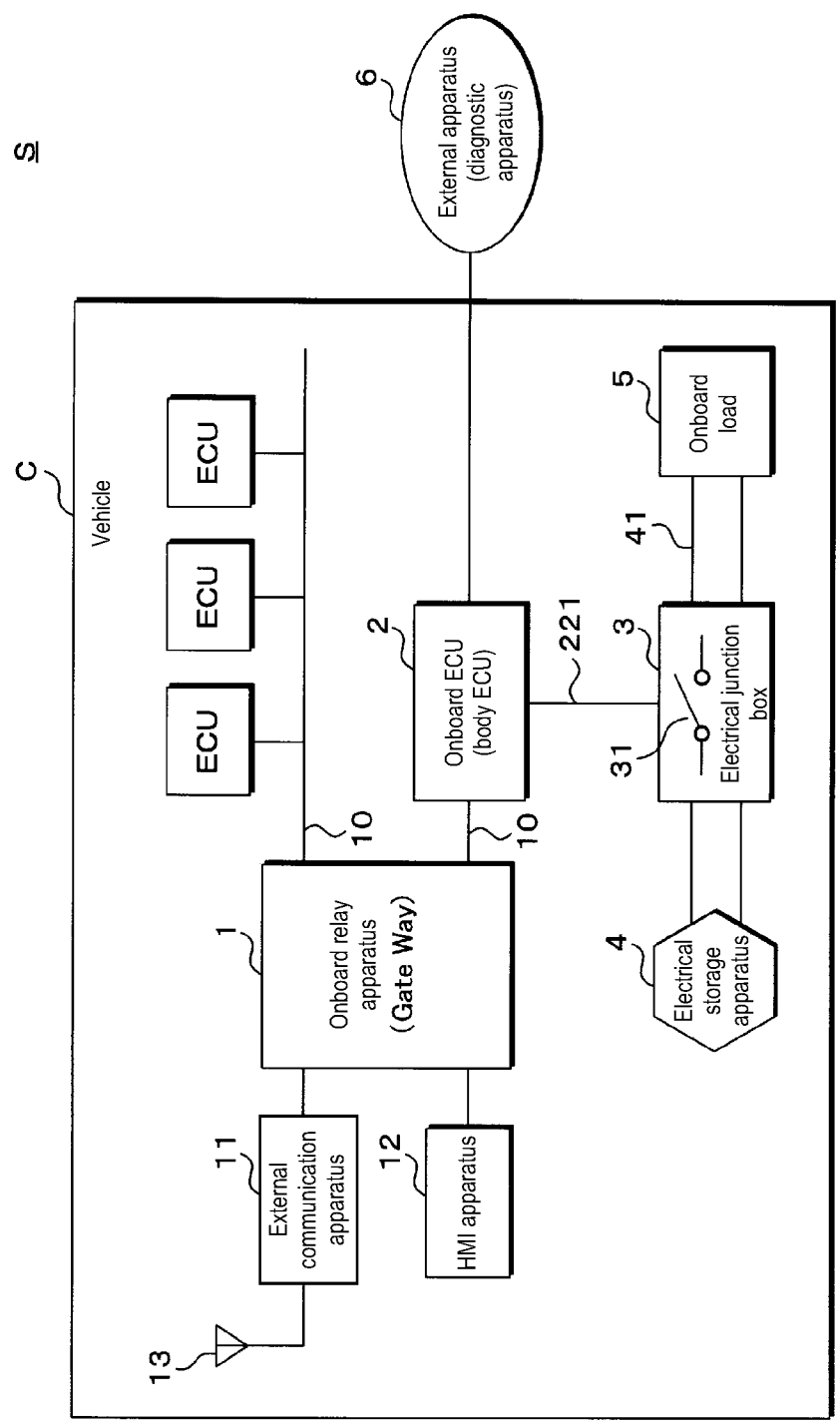
FIG. 1 is a schematic diagram illustrating a configuration of an onboard system that includes an onboard ECU and the like according to a first embodiment.

Firstly, embodiments of the present disclosure will be listed and described. One or more parts of the embodiments described below may be combined in a discretionary manner.

An onboard ECU according to one aspect of the present disclosure is an onboard ECU for controlling an onboard apparatus installed in a vehicle, including a storage unit configured to store a control program for controlling the onboard apparatus and an inspection program for performing an operation check of the onboard apparatus or the onboard ECU, and a control unit configured to execute the control program or the inspection program, the storage unit storing validity information indicating whether the inspection program is valid or invalid, and the control unit referring to the validity information stored in the storage unit, executing the inspection program if the inspection program is valid, and executing the control program if the inspection program is invalid.

In this aspect, the storage unit of the onboard ECU for controlling the onboard apparatus stores a control program for controlling the onboard apparatus and an inspection program for performing an operation check of the onboard apparatus. The storage unit also stores validity information indicating whether the inspection program is valid or invalid. When starting the onboard ECU, for example, the control unit of the onboard ECU accesses the storage unit, and reads out the validity information stored in the storage unit. If the validity information indicates that the inspection program is valid, the control unit executes the inspection program. If the validity information indicates that the inspection program is invalid, the control unit executes the control program. Therefore, the control unit can selectively execute the inspection program or the control program based on content indicated by the validity information, and efficiently use the inspection program.

In the onboard ECU according to a first aspect of the present disclosure, the validity information that is stored in the storage unit is changed from valid to invalid in a manufacturing process of the onboard ECU or the vehicle.

In the first aspect, the validity information that is stored in the storage unit is changed from valid to invalid in a manufacturing process of the onboard ECU or the vehicle, and thus, in the vehicle shipped after the manufacturing process, the validity information indicates invalid, in other words, the validity information indicates that the inspection program is invalid. Therefore, it is possible to efficiently prevent the inspection program from being executed by the control unit of the onboard ECU, in the vehicle shipped to market.

In the onboard ECU according to a second aspect of the present disclosure, the storage unit stores a boot program that is executed when the onboard ECU is started, the storage unit includes a first region accessible by the control unit that is executing control program, and a second region to which access by the control unit that is executing the control program is restricted, the validity information is stored in the second region, and the control unit that is executing the boot program accesses the second region based on a physical address.

In the second aspect, the storage unit includes a first region accessible by the control unit that is executing the control program and a second region to which access by the control unit that is executing the control program is restricted, and the validity information is stored in the second region. Therefore, in normal times such as when the vehicle is travelling, the validity information is stored in a storage region (the second region) to which access by the control program that is executed by the control unit is restricted. Accordingly, it is possible to efficiently prevent the validity information from being altered by the control unit that is executing the control program.

In the onboard ECU according to the third aspect of the present disclosure, a storage capacity of the second region is smaller than a storage capacity of the first region.

In the third aspect, the storage capacity of the second region in which the validity information is stored is smaller than the storage capacity of the first region accessible by the control unit that is executing the control program. The control unit that is executing the control program writes, for example, log data of control or drive of the onboard apparatus, in the accessible first region, and stores this data in the storage unit. Therefore, by setting the storage capacity of the second region smaller than the storage capacity of the first region, it is possible to sufficiently secure the storage capacity of the first region to store data required for control and the like of the onboard apparatus, secure the second region required for storing the validity information for which a bit flag is used, for example, and efficiently use the storage capacity of the storage unit.

In the onboard ECU according to a fourth aspect of the present disclosure, when a request signal transmitted from an external apparatus outside the vehicle is obtained, the control unit refers to the validity information stored in the storage unit, and determines whether the inspection program is valid or invalid, based on the validity information.

In the fourth aspect, when a request signal transmitted from an external apparatus outside the vehicle is obtained, the control unit refers to the validity information stored in the storage unit, and determines whether the inspection program is valid or invalid, based on the validity information. Therefore, the inspection program is executed when two requirements, namely, a request signal being obtained and the inspection program being valid are satisfied. Accordingly, it is possible to provide stricter requirements for the inspection program to be executed, and to efficiently prevent the inspection program from being mistakenly executed.

In the onboard ECU according to the fifth aspect of the present disclosure, an identifier included in the request signal transmitted from the external apparatus is different from an identifier that is used for communication with another onboard ECU installed in the vehicle.

In the fifth aspect, an identifier included in a request signal transmitted from an external apparatus is different from an identifier that is used for communication with another onboard ECU installed in the vehicle. Therefore, when performing processing for obtaining a request signal transmitted from an external apparatus, it is possible to efficiently eliminate the influence from communication with another onboard ECU installed in the vehicle, and efficiently secure the reliability of the processing for obtaining a request signal.

The onboard ECU according to a sixth aspect of the present disclosure includes an acceptance unit configured to accept access to the storage unit in which the validity information is stored, and the validity information stored in the storage unit is changed from invalid to valid based on a signal accepted via the acceptance unit.

In the sixth aspect, the onboard ECU includes an acceptance unit such as an input/output I/F for accepting access to the storage unit in which the validity information is stored. The onboard ECU accepts, via the acceptance unit, a signal output from a diagnostic apparatus connected to the acceptance unit. The validity information changed from valid to invalid in a manufacturing process of the onboard ECU or the vehicle, for example, is changed from invalid to valid based on the signal accepted via the acceptance unit. By accepting a signal output from a diagnostic apparatus using such an acceptance unit, it is possible to change the validity information from invalid to valid, and, for example, even after shipment of the vehicle, the inspection program can be executed again as necessary.

In the onboard ECU according to a seventh aspect of the present disclosure, the onboard apparatus is an electrical junction box disposed between an electrical storage apparatus and an onboard load that are installed in the vehicle, the electrical junction box includes a relay configured to perform/stop power supply from the electrical storage apparatus to the onboard load, and the control unit performs control so as to open/close the relay included in the electrical junction box.

In the seventh aspect, the onboard apparatus is an electrical junction box disposed between an electrical storage apparatus and an onboard load that are installed in the vehicle, a relay is included in the electrical junction box, and performs/stops power supply from the electrical storage apparatus to the onboard load, and the control unit performs control so as to open/close the relay. Therefore, the inspection program is used for performing an operation check of the relay, for example, and the control unit can selectively execute the control program for performing control so as to open/close the relay and the inspection program for performing an operation check of the relay, by referring to the validity information.

In the onboard ECU according to an eighth aspect of the present disclosure, the control unit that is executing the control program monitors the validity information at a predetermined timing, after the validity information is changed from valid to invalid, and outputs information regarding a result of the monitoring if the validity information indicates that the inspection program is valid.

In the eighth aspect, after the validity information is changed from valid to invalid, the control unit that is executing the control program monitors the validity information at a predetermined timing such as when the vehicle is started or stopped or at a predetermined time. Then, if the validity information indicates that the inspection program is valid, the control unit that is executing the control program outputs information regarding a result of the monitoring to an HMI apparatus such as a display apparatus installed in the vehicle. Essentially, in the vehicle after shipment, a state where the validity information indicates invalid is maintained. Based on this, the control unit that is executing the control program periodically or constantly monitors the validity information at a predetermined timing. Therefore, even if, in the storage region in which the validity information is stored, a phenomenon such as bit inversion occurs, for example, and the validity information is changed to valid, it is possible to notify the operator and the like of the vehicle that the validity information indicates valid, in other words the validity information has been unintentionally changed to valid, by outputting such a message to the HMI apparatus and the like.

A program according to a ninth aspect of the present disclosure causes a computer to execute processing for referring to a storage unit configured to store a control program for controlling an onboard apparatus, an inspection program for performing an operation check of the onboard apparatus or an onboard ECU for controlling the onboard apparatus, and validity information indicating whether the inspection program is valid or invalid, executing the inspection program if the validity information indicates that the inspection program is valid, and executing the control program if the validity information indicates that the inspection program is invalid.

In the ninth aspect, a computer can be made operate as an onboard ECU that efficiently uses an inspection program for performing an operation check of an apparatus that includes this onboard ECU.

An information processing method according to a tenth aspect of the present disclosure causes a computer to execute processing for referring to a storage unit configured to store a control program for controlling an onboard apparatus, an inspection program for performing an operation check of the onboard apparatus or an onboard ECU for controlling the onboard apparatus, and validity information indicating whether the inspection program is valid or invalid, executing the inspection program if the validity information indicates that the inspection program is valid, and executing the control program if the validity information indicates that the inspection program is invalid.

In the tenth aspect, it is possible to provide an information processing method for causing a computer to operate as an onboard ECU that efficiently uses an inspection program for performing an operation check of an apparatus that includes this onboard ECU.

Specific examples of an onboard ECU 2 according to embodiments of the present disclosure will be described below with reference to the diagrams. Note that the present disclosure is not limited to these examples. The present disclosure is defined by the claims, and all changes that come within the meaning and range of equivalency of the claims are intended to be embraced therein.

First Embodiment

Figure 2:
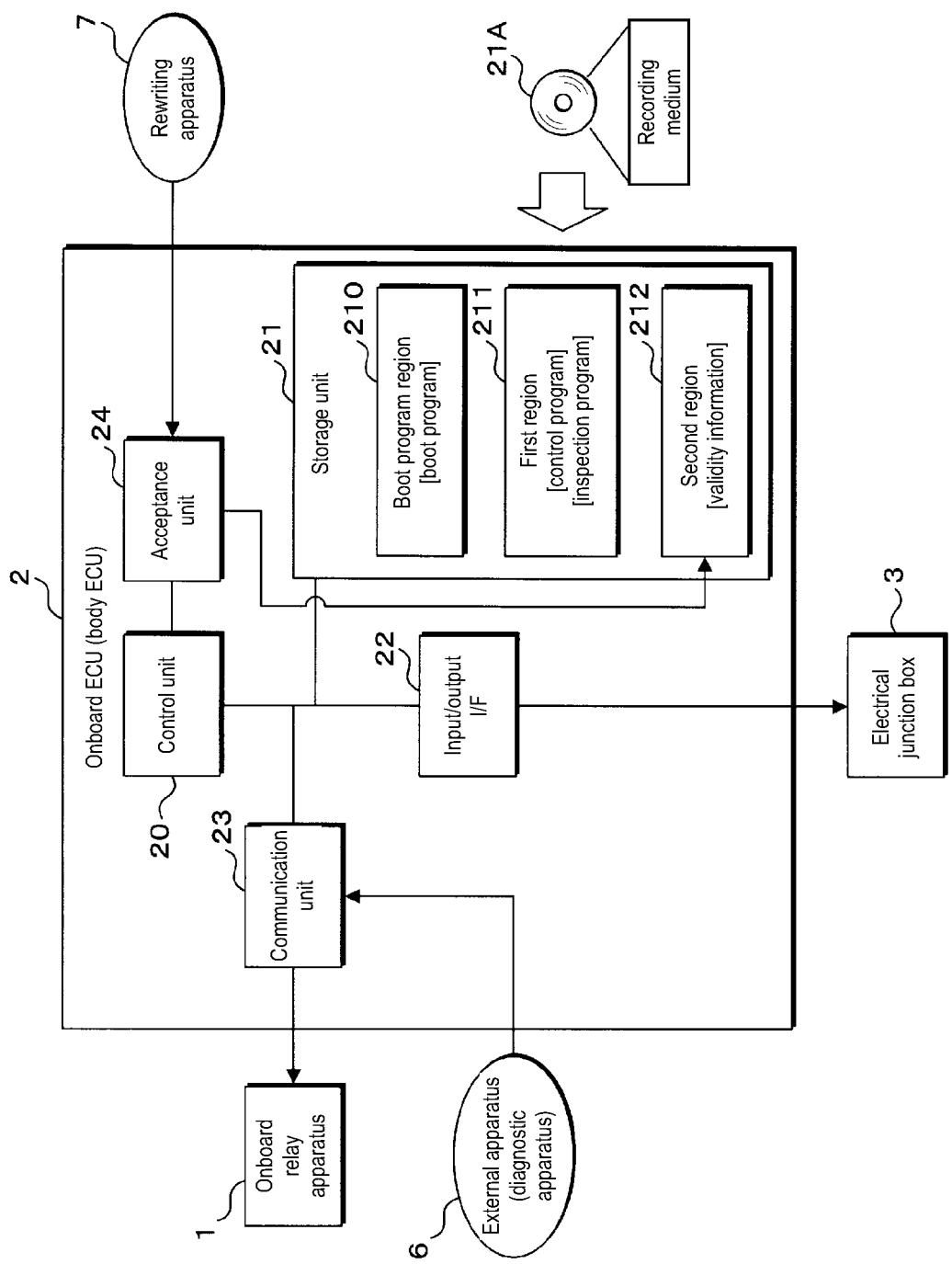

An embodiment will be described below with reference to drawings. FIG. is a schematic diagram illustrating an example of a configuration of an onboard system S that includes an onboard ECU 2 and the like according to a first embodiment. FIG. 2 is a block diagram illustrating an example of an internal configuration of the onboard ECU 2 and the like. The onboard system S includes the onboard ECU 2 and an electrical junction box 3 (onboard apparatus) that is connected to the onboard ECU 2. The onboard ECU 2 is communicably connected to onboard devices such as other onboard ECUs (ECUs) and an actuator or an external communication apparatus 11 via an onboard relay apparatus 1, and controls an onboard apparatus such as the electrical junction box 3 that is connected to the onboard ECU 2 itself, for example, based on a signal or the like output from one of these onboard devices.

The onboard relay apparatus 1 integrates a plurality of system segments including an onboard device such as a control system ECU, an onboard device such as a safety system ECU, and a body system onboard device such as a BCU (Body Control Unit), and relays communication of onboard devices between the segments. The onboard relay apparatus 1 is a gateway or an Ethernet switch, for example, which may function as a layer 2 switch, a layer 3 switch, and a CAN gateway. The onboard relay apparatus 1 is further connected to the external communication apparatus 11 and an HMI apparatus 12. The onboard relay apparatus 1, the onboard ECU 2, and the like are connected using a communication line 10 such as an Ethernet (registered trademark) cable or a CAN cable.

The external communication apparatus 11 is a communication apparatus for performing wireless communication using a mobile communication protocol such as LTE, 4G, 5G, or WiFi, and transmits/receives data to/from an external server (not illustrated) positioned outside a vehicle C, via an antenna connected to the external communication apparatus 11.

The HMI apparatus 12 is a display apparatus such as a display of a car navigation. The display apparatus displays information output from the onboard ECU 2 via the onboard relay apparatus 1.

The electrical junction box 3 includes a relay 31 formed of a semiconductor such as a FET or the like and a fuse (not illustrated), and is provided between an electrical storage apparatus 4 and an onboard load 5. The electrical storage apparatus 4 is a secondary battery such as a lead battery or a lithium battery, and is a power source for the onboard load 5 that is installed in the vehicle C. The onboard load 5 is a load apparatus such as a car air conditioner, a lamp apparatus, or the like, and is driven using power supplied from the electrical storage apparatus 4.

The electrical junction box 3, the electrical storage apparatus 4, and the onboard load 5 are connected by a power line 41. The electrical junction box 3 and the onboard ECU 2 are connected by a signal line 221, and the relay 31 of the electrical junction box 3 is controlled to be switched on (closed) or off (open), based on a signal output from the onboard ECU 2 via the signal line 221. As a result of the relay 31 of the electrical junction box 3 being switched on or off, supply of power from the electrical storage apparatus 4 to the onboard load 5 is started or stopped.

The electrical junction box 3 is an example of an onboard apparatus that is connected to the onboard ECU 2, and there is no limitation thereto. The onboard apparatus that is connected to the onboard ECU 2 may also be various actuators installed in the vehicle C such as a door drive apparatus or a lamp apparatus.

The onboard ECU 2 includes a control unit 20, a storage unit 21, an input/output I/F 22, a communication unit 23, and an acceptance unit 24. The control unit 20 is constituted by a CPU (Central Processing Unit) or an MPU (Micro Processing Unit), and the like, and performs control processing and the like by reading out and executing a program and data stored in the storage unit 21.

The storage unit 21 is constituted by a volatile memory element such as a random access memory (RAM) or a non-volatile memory element such as a read only memory (ROM), an electrically erasable programmable ROM (EEPROM), or a flash memory. The storage unit 21 stores programs and data for executing the programs. The programs and the like may be those read out from a recording medium readable by the onboard ECU 2 and then stored. The programs and the like may be those downloaded from an external computer (not illustrated) connected to a communication network (not illustrated), and stored in the storage unit 21.

The programs stored in the storage unit 21 include a startup program such as a boot program, a control program, and an inspection program. The storage unit also stores validity information indicating whether or not the inspection program is valid. The storage unit 21 is classified into a plurality of regions, and, as an example, is classified into a boot program region 210, a first region 211, and a second region 212. A startup program such as the boot program is stored in the boot program region 210. The control program and the inspection program are stored in the first region 211. The validity information indicating whether or not the inspection program is valid is stored in the second region 212. The validity information may be defined as a bit flag the value of which is expressed as 0 or 1, for example. As an example of the bit flag, "0" may indicate that the inspection program is invalid while "1" may indicate that the inspection program is valid. The first region 211 and the second region 212 are classified such that the storage capacity of the second region 212 is smaller than the storage capacity of the first region 211.

The input/output I/F 22 is connected to the signal line 221 formed by a wire harness such as a serial cable, and a signal generated by the control unit 20 is output to the electrical junction box 3 via the input/output I/F 22 and the signal line 221.

The communication unit 23 is an Ethernet PHY unit for a TCP/IP packet transmitted by the communication line 10 formed by a 100 BASE-T1 or 1000 BASE-T1 Ethernet cable. Alternatively, the communication unit 23 may also be a CAN transceiver that complies with the CAN protocol.

The acceptance unit 24 is an input/output port that directly accesses the storage unit 21, and is connected to a rewriting apparatus 7 such as a ROM writer that is used for directly changing information stored in the storage unit 21. It is possible to change (rewrite) the validity information stored in the second region 212 of the storage unit 21, using the rewriting apparatus 7 connected to the acceptance unit 24.

An external apparatus 6 is a diagnostic apparatus for product inspection that is connected to the communication unit 23 of the onboard ECU 2 in a manufacturing stage of the vehicle C or the onboard ECU 2 that is connected to the electrical junction box 3. The external apparatus 6 is an apparatus in which a dedicated application is installed in a general-purpose information terminal such as a personal computer, a tablet PC, or a smartphone, or an apparatus that includes hardware and is configured as a dedicated information terminal. The external apparatus 6 may be communicably connected to the onboard ECU 2 via the onboard relay apparatus 1. The external apparatus 6 outputs (transmits) a signal (request signal) related to a request (entry request) to execute the inspection program, to the onboard ECU 2. When the signal (request signal) related to the request (entry request) to execute the inspection program is received from the external apparatus 6, the control unit 20 of the onboard ECU 2 may perform processing related to start of the inspection program, which will be described later in detail.

When the onboard ECU 2 is started, the control unit 20 of the onboard ECU 2 functions as a startup processing unit that executes a startup program such as the boot program, and performs startup processing. As startup processing of the onboard ECU 2, the control unit 20 that is executing a startup program such as the boot program refers to the validity information stored in the second region 212 based on a physical address of the storage unit 21, and selectively executes the control program or the inspection program in accordance with the value (0 or 1) of the validity information (bit flag). The control unit 20 of the onboard ECU 2 functions as an onboard apparatus control processing unit that performs processing related to control of an onboard apparatus such as the electrical junction box 3 connected to the ECU 2 itself, by executing the control program. The control unit 20 of the onboard ECU 2 functions as an inspection processing unit that performs inspection processing such as self-diagnostic processing of the ECU 2 itself, and processing for checking connection with an onboard apparatus such as the electrical junction box connected to the ECU 2 itself, by executing the inspection program.

The boot program region 210 of the storage unit 21 is classified as a region with an initial block number (0th block) of the physical address of the storage unit 21, for example. When starting the onboard ECU 2, the control unit 20 of the ECU itself executes the boot program stored in the boot program region 210, and selectively executes the control program or the inspection program based on the validity information stored in the second region 212.

The first region 211 of the storage unit 21 is classified as a region accessible by the control unit 20 that is executing the control program. That is to say, the control unit 20 that is executing the control program makes reference-related access and write-related access to the first region 211 addressed using a logical address.

The second region 212 of the storage unit 21 is classified as a region to which access by the control unit 20 that is executing the control program is restricted. The second region 212 has not been addressed using a logical address, and thus the control unit 20 that is executing the control program cannot access the second region using a logical address similarly to the first region 211. In order to access the second region 212, the control unit 20 needs to access the second region 212 using a physical address. The control unit 20 that is executing a startup program such as the boot program refers to the validity information stored in the second region 212, based on a predetermined physical address.

The second region 212 is a region for storing the validity information that is referred to when the onboard ECU 2 is started, and thus the first region 211 and the second region 212 are classified in the storage unit 21 such that the storage capacity of the second region 212 is smaller than the storage capacity of the first region 211. By classifying the first region 211 and the second region 212 in this manner, it is possible to sufficiently secure the storage capacity of the first region that is used when controlling an onboard apparatus such as the electrical junction box 3, and to efficiently use the storage capacity of the storage unit 21.

The present embodiment describes the startup program that is executed by the control unit 20 when starting the onboard ECU 2 as being a boot program, but there is no limitation thereto. The startup program that is executed by the control unit 20 when starting the onboard ECU 2 may also be a control program for controlling an onboard apparatus that is connected to the onboard ECU 2. A configuration may also be adopted in which, when starting the onboard ECU 2, the control unit 20 executes the control program, and the control unit 20 that is executing the control program refers to the validity information stored in the second region 212, based on a physical address.

Before the inspection program is executed in a manufacturing stage of the vehicle C or the onboard ECU 2 that is connected to the electrical junction box 3, the validity information indicates that the inspection program is valid. That is to say, before the inspection program is executed, the value of the validity information is stored in the second region 212 as "1" (the inspection program is valid).

After the inspection program is executed in a manufacturing stage of the vehicle C or the onboard ECU 2 that is connected to the electrical junction box 3, and inspection of the onboard ECU 2 and the electrical junction box 3 is complete, the validity information is changed to indicate that the inspection program is invalid. That is to say, after the inspection program is executed, the value of the validity information is changed to "0" (the inspection program is invalid), and is stored in the second region 212.

After the value of the validity information is changed to "0" (the inspection program is invalid), and is stored in the second region 212, the vehicle C that includes the onboard ECU 2 is shipped to market. After shipment of the vehicle C, the value of the validity information (0: the inspection program is invalid) stored in the second region 212 is maintained without being changed, and thus, after the manufacturing process, it is possible to efficiently prevent the inspection program from being unintentionally executed. Thereafter, if the vehicle C has a failure, and there is a need to repair the vehicle C or analyze the cause of the failure, it is possible to execute the inspection program again by connecting the rewriting apparatus 7 to the acceptance unit 24, and directly rewriting the validity information stored in the second region 212 to "1" (the inspection program is valid).

Figure 3:
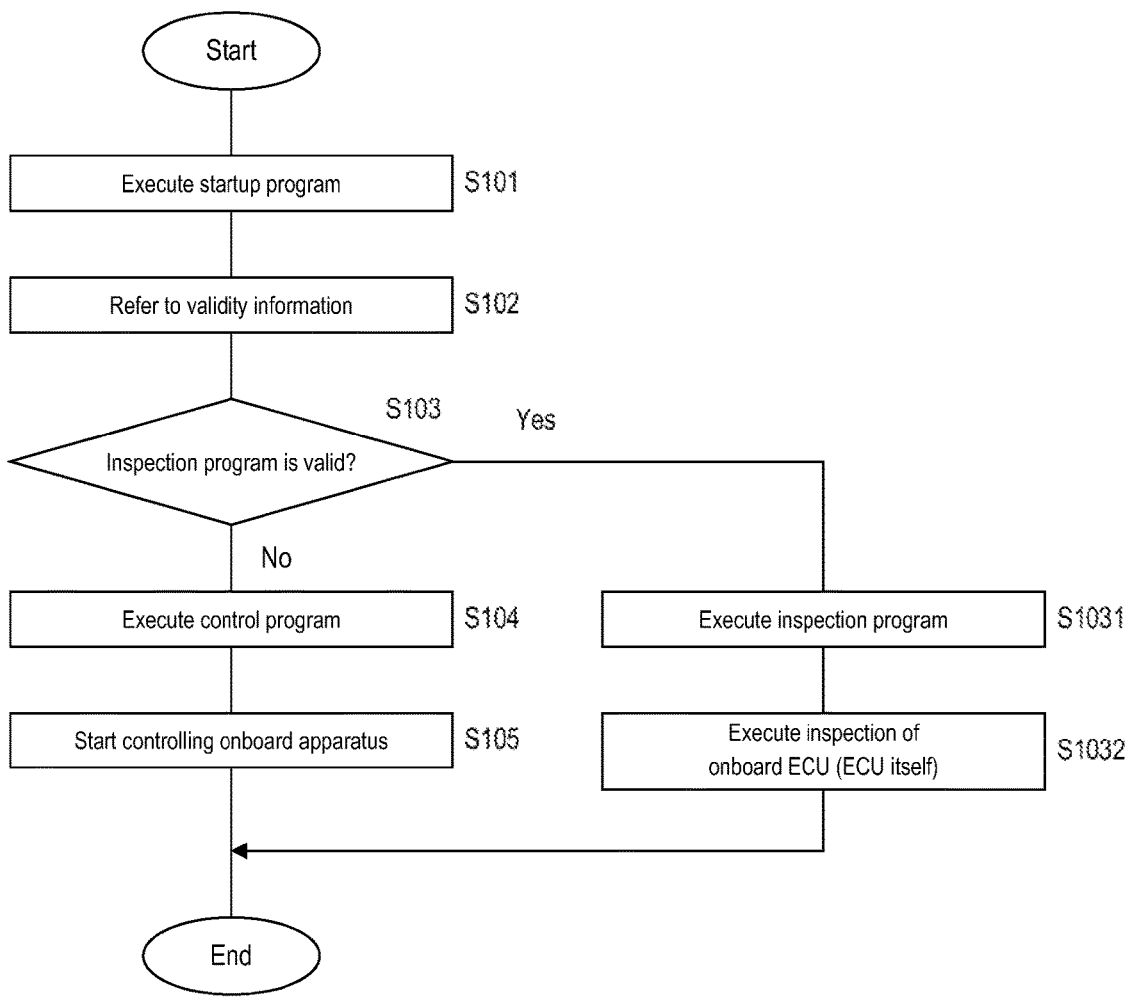
FIG. 3 is a flowchart illustrating an example of processing that is performed by a control unit of the onboard ECU.

FIG. 3 is a flowchart illustrating an example of processing that is performed by the control unit 20 of the onboard ECU 2. When a request to start the onboard ECU 2 is made, such as when the ignition switch (IG switch) for starting or stopping the vehicle C is turned on, the control unit 20 of the onboard ECU 2 performs the following processing.

The control unit 20 of the onboard ECU 2 executes a startup program such as the boot program (step S101). When a request to start the onboard ECU 2 is made, such as when drive power is supplied or a start request signal is input, the control unit 20 executes a startup program such as the boot program. The boot program is stored in the boot program region 210 with an initial block number (0th block) of the physical address of the storage unit 21, and the control unit 20 reads out and executes the boot program by referring to the boot program region 210. The startup program is not limited to the boot program that is executed only when the onboard ECU 2 is started, and may also be a control program for controlling an onboard apparatus that is connected to the onboard ECU 2.

The control unit 20 of the onboard ECU 2 refers to the validity information stored in the second region 212 (step S102). A startup program constituted by a boot program or a control program that is executed when the onboard ECU 2 is started is coded so as to refer to the second region 212 for which a block number of the physical address is determined in advance based on the physical address of the storage unit 21. The control unit 20 that is executing the startup program refers to the validity information stored in the second region 212 based on the physical address, thereby obtaining the value of the validity information. If the validity information is defined as a bit flag expressed as 0 or 1, for example, the control unit may obtain the value of the validity information based on the physical address indicating the block number of the bit.

The control unit 20 of the onboard ECU 2 determines whether or not the inspection program is valid, based on the validity information (step S103). As an example of the value of the validity information (bit flag), if 0 indicates that the inspection program is invalid and 1 indicates that the inspection program is valid, the control unit 20 determines whether or not inspection program is valid, based on that value.

If the inspection program is valid (step S103: YES), the control unit 20 of the onboard ECU 2 executes the inspection program (step S1031). A configuration may be adopted in which, if the inspection program is valid, the control unit 20 that is executing a startup program such as the boot program executes the inspection program, and then ends the startup program. By ending the startup program after executing the inspection program, the control unit 20 transitions the program that is being executed from the startup program to the inspection program, and changes the operation state (processing mode) of the onboard ECU 2 from a startup processing state to an inspection processing state.

The control unit 20 of the onboard ECU 2 executes inspection of the onboard ECU 2 itself, based on the inspection program (step S1032). The control unit 20 performs inspection processing such as self-diagnostic processing of the ECU itself, processing for checking connection with an onboard apparatus such as the electrical junction box 3 connected to the ECU 2 itself, and processing for checking an operation of the relay 31, a switch, and the like included in the electrical junction box 3, based on processing content coded in the inspection program.

If the inspection program is not valid (step S103: NO), in other words, if the inspection program is invalid, the control unit 20 of the onboard ECU 2 executes the control program (step S104). If the inspection program is not valid (invalid), the control unit 20 that is executing a startup program such as the boot program ends the startup program after executing the control program, and thereby transitions the program that is being executed from the startup program to the control program, and changes the operation state of the onboard ECU 2 (processing mode) from a startup processing state to a control processing state. In the processing of step S101, if the control program is being executed as a startup program, the control unit 20 of the onboard ECU 2 may maintain the state of the control program being executed and continue executing the control program. That is to say, a processing sequence in the control program may be a processing sequence for performing processing related to control of an onboard apparatus that is connected to the ECU 2 itself, as post-processing after performing processing for determination on the validity information.

The control unit 20 of the onboard ECU 2 starts controlling an onboard apparatus such as the electrical junction box 3 that is connected to the ECU 2 itself, based on the control program (step S105). If the onboard ECU 2 is a body ECU (BCU) that performs overall control of the vehicle C, the onboard ECU 2 receives a signal output based on an operation performed by the operator of the vehicle C, for example, and performs control for driving an onboard apparatus that is connected to the ECU 2 itself, based on the signal. After executing the processing of step S105 or S1032, the control unit 20 of the onboard ECU 2 ends the series of processing in this flow. Alternatively, after executing the processing of step S105, the control unit of the onboard ECU 2 may perform loop processing to carry out steps S104 and S105 again, and continue control of the onboard apparatus.

According to the present embodiment, the control unit 20 of the onboard ECU 2 can selectively execute the inspection program or the control program, and efficiently use the inspection program, based on content indicated by the validity information (the value of the bit flag) stored in the second region 212 of the storage unit 21.

The validity information stored in the second region 212 is changed from valid to invalid in the manufacturing process of the onboard ECU 2 or the vehicle C, and thus, in the vehicle C shipped after the manufacturing process, the validity information has been rewritten to indicate invalid (that the inspection program is invalid). Therefore, in the vehicle C shipped to market, it is possible to efficiently prevent the inspection program from being unintentionally executed. Thereafter, when the vehicle C has a failure or the like, it is possible to rewrite the validity information from invalid to valid and execute the inspection program again in a repair process or the like of the vehicle C, by directly connecting the rewriting apparatus 7 to the acceptance unit 24 of the onboard ECU 2, and using data, a signal, or the like output from the rewriting apparatus 7.

According to the present embodiment, the second region 212 in which the validity information of the inspection program is stored is classified as a region in which access by the control unit 20 that is executing the control program is restricted. That is to say, the validity information is stored in the second region 212 for which a logical address that is used when the control unit 20 executing the control program accesses the storage unit 21 (the first region 211) is not defined. Therefore, in normal times such as when the vehicle C is travelling, it is possible to efficiently prevent the validity information from being altered by the control unit 20 executing the control program.

Second Embodiment

Figure 4:
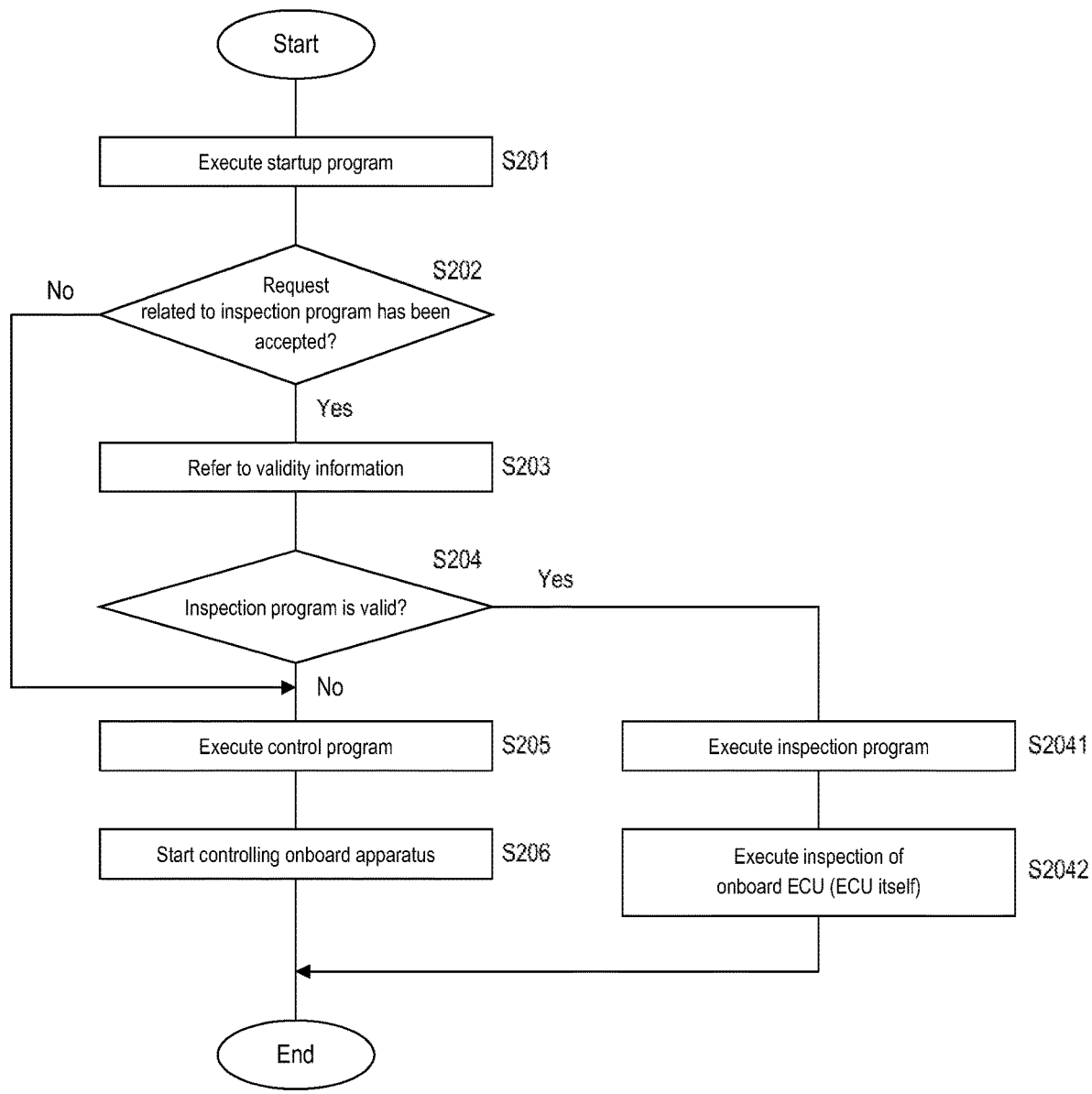
FIG. 4 is a flowchart illustrating an example of processing that is performed by a control unit of an onboard ECU according to a second embodiment (request signal).

FIG. 4 is a flowchart illustrating an example of processing that is performed by the control unit 20 of the onboard ECU 2 according to a second embodiment (request signal). When a request to start the onboard ECU 2 is made, such as when the ignition switch (IG switch) for starting or stopping the vehicle C is turned on, the control unit 20 of the onboard ECU 2 performs the following processing. The control unit 20 of the onboard ECU 2 performs the processing of step S201 similarly to the processing of step S101 in the first embodiment.

The control unit 20 of the onboard ECU 2 determines whether or not a request related to the inspection program has been accepted (step S202). As described above, in a manufacturing stage or during maintenance work of the onboard ECU 2 or the like, the external apparatus 6 is connected to the communication unit 23 of the onboard ECU 2. In this case, when the onboard ECU is started, a request signal related to a request (entry request) to execute the inspection program is output (transmitted) from the external apparatus 6. When a request signal is output from the external apparatus 6, the control unit 20 obtains (receives) the request signal via the communication unit 23.

When outputting a request signal, the external apparatus 6 may output the request signal with an identifier different from an identifier that is used in communication with another onboard ECU installed in the vehicle C. A configuration may be adopted in which, when communication with the onboard ECU in the vehicle C is performed, for example, in compliance with CAN, the identifier corresponds to a CAN-ID, and, when the communication is performed, for example, in compliance with Ethernet (TCP/IP), the identifier corresponds to a port number. By using different identifiers in this manner, when the control unit 20 of the onboard ECU 2 performs processing for obtaining a request signal transmitted from the external apparatus 6, it is possible to efficiently eliminate the influence from communication with another onboard ECU installed in the vehicle C, and secure the reliability of the processing for obtaining the request signal. If the external apparatus 6 is not connected to the communication unit 23, the control unit 20 does not obtain a request signal (entry request).

If a request related to the inspection program has been accepted (step S202: YES), the control unit 20 performs the processing of step S203 similarly to the processing of step S102 in the first embodiment. The control unit 20 performs the processing of steps S204 to S206 and S2042 similarly to steps S103 to S105 and S1032, which is the processing after step S102 in the first embodiment.

When a request related to the inspection program has not been accepted (step S202: NO), the control unit 20 performs the processing of steps S205 and S206, similarly to the processing of steps S104 and S105 in the first embodiment. After executing the processing of step S206 or S2042, the control unit 20 of the onboard ECU 2 ends the series of processing in this flow. Alternatively, after executing the processing of step S206, the control unit 20 of the onboard ECU 2 may perform loop processing in order to carry out steps S205 and S206 again, and continue control of the onboard apparatus.

According to the present embodiment, when a request signal transmitted from the external apparatus 6 outside the vehicle C is received, the control unit 20 of the onboard ECU 2 refers to the validity information stored in the storage unit 21, and determines whether the inspection program is valid or invalid, based on the validity information. Therefore, in order to execute the inspection program, two requirements, namely, a request signal being obtained and the inspection program being valid need to be satisfied, and it is possible to provide stricter requirements for the inspection program to be executed, and to efficiently prevent the inspection program from being mistakenly executed.

Third Embodiment

Figure 5:
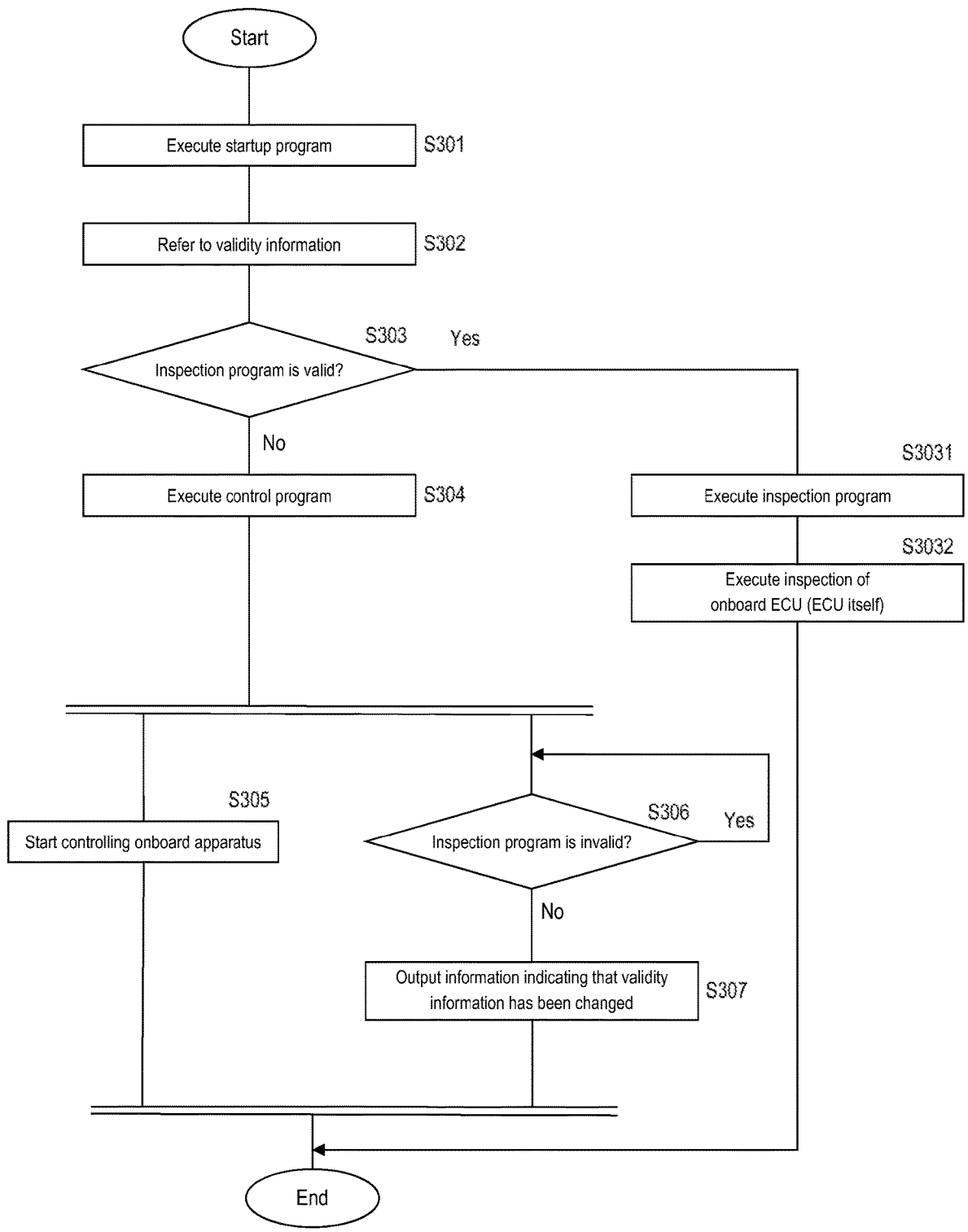
FIG. 5 is a flowchart illustrating an example of processing that is performed by a control unit of an onboard ECU according to a third embodiment (monitoring).

FIG. 5 is a flowchart illustrating an example of processing that is performed by the control unit 20 of the onboard ECU 2 according to a third embodiment (monitoring). When a request to start the onboard ECU 2 is made such as when the ignition switch (IG switch) for starting or stopping the vehicle C is turned on, the control unit 20 of the onboard ECU 2 performs the following processing. The control unit 20 of the onboard ECU 2 performs the processing of steps S301 to S304, S3031, and S3032, similarly to the processing of steps S101 to S104, S1031, and S1032 in the first embodiment.

By executing the control program in the processing of step S304, the control unit 20 of the onboard ECU 2 performs processing for starting control of an onboard apparatus (step S305) similarly to step S105 in the first embodiment, and determines whether or not the inspection program is invalid (step S306). A configuration may be adopted in which, for example, by generating a subprocess, the control unit 20 that is executing the control program performs processing related to control of the onboard apparatus, which is the processing of step S305, and carries out processing for determining whether or not the inspection program is invalid, as parallel processing. After executing the processing of steps S305, S307, or S3032, the control unit 20 of the onboard ECU 2 ends the series of processing in this flow. Alternatively, after executing the processing of steps S305 and S307, the control unit of the onboard ECU 2 may perform loop processing in order to carry out steps S305, S306, and S307 again, and continue control of the onboard apparatus and monitoring of the validity information indicating that the inspection program is invalid.

Similarly to the processing of step S303, the control unit 20 refers to the validity information stored in the second region 212, and obtains the value of the validity information. The validity information may be defined as a bit flag indicated by 0 or 1, for example, where "0" indicates that the inspection program is invalid while "1" indicates that the inspection program is valid.

In the series of processing in this flow, the processing of step S306 is performed under condition that the inspection program is not valid (0: the inspection program is invalid) in step S303, and during the processing of these steps, the validity information indicating the validity of the inspection program (bit flag) is not changed by the control program that is executed by the control unit 20. However, there may be the possibility that, in the second region 212 in which the validity information is stored, a phenomenon of bit inversion (inversion from 0 to 1) will occur due to electric noise, collision of cosmic rays, or the like. Therefore, even when the control unit 20 is executing the control program, the control unit 20 can detect an event of the validity information being unintentionally changed due to bit inversion or the likes, for example, by generating a subprocess and continuously monitoring whether the inspection program is invalid.

When monitoring whether or not the inspection program is invalid, the control unit 20 may access the second region 212 in which the validity information is stored, based on a physical address, and refer to the validity information. Therefore, the control unit 20 that is executing the control program makes reference-related access and write-related access to the first region 211 of the storage unit 21 using a logical address, regarding processing for controlling an onboard apparatus, and makes reference-related access to the second region 212 of the storage unit 21 based on the physical address, regarding monitoring processing on whether or not the inspection program is invalid. As a result of an address system for accessing the storage unit 21 differing in accordance with a type of processing in this manner, it is possible to secure the robustness of the validity information stored in the second region 212.

If the inspection program is invalid (step S306: YES), the control unit 20 of the onboard ECU 2 performs loop processing in order to execute the processing of step S306 again. By performing the loop processing, the control unit 20 that is executing the control program can periodically and continuously monitor whether the inspection program is invalid.

If the inspection program is not invalid (step S306: NO), in other words, if the inspection program is valid, the control unit 20 of the onboard ECU 2 outputs information indicating that the validity information has been changed.

A case where the inspection program is not invalid refers to a case where the validity information has been unintentionally changed from invalid to valid due to bit inversion or the like, as described above. If the inspection program is valid, the control unit 20 of the onboard ECU 2 outputs information indicating that the validity information has been unintentionally changed from invalid to valid, to the HMI apparatus via the onboard relay apparatus 1, or to an external server via the onboard relay apparatus 1 and the external communication apparatus 11, for example. By outputting information indicating that the validity information has been changed, for example, to the HMI apparatus 12 or the external server, it is possible to efficiently notify the operator of the vehicle C or the administrator of the external server of the information.

The embodiments disclosed herein are examples in all respects and should not be interpreted as limiting in any manner. The scope of the present disclosure is defined not by the foregoing description, but by the claims, and all changes that come within the meaning and range of equivalency of the claims are intended to be embraced therein.

The invention claimed is:

1. An onboard Electronic Control Unit ("ECU") for controlling an onboard apparatus installed in a vehicle, comprising:
   a storage unit configured to store a control program for controlling the onboard apparatus and an inspection program for performing an operation check of the onboard apparatus or the onboard ECU; and
   a control unit configured to execute the control program or the inspection program,
   wherein the storage unit stores validity information indicating whether the inspection program is valid or invalid,
   the control unit refers to the validity information stored in the storage unit,
   executes the inspection program if the inspection program is valid, and
   executes the control program if the inspection program is invalid,
   the storage unit stores a boot program that is executed when the onboard ECU is started,
   the storage unit includes a first region accessible by the control unit that is executing the control program, and a second region to which access by the control unit that is executing the control program is restricted,
   the validity information is stored in the second region,
   the control unit that is executing the boot program accesses the second region using a physical address,
   the control unit that is executing the control program writes log data of control or drive of the onboard apparatus, in the first region, and
   a storage capacity of the second region is smaller than a storage capacity of the first region.

2. The onboard ECU according to claim 1, wherein the validity information that is stored in the storage unit is changed from valid to invalid in a manufacturing process of the onboard ECU or the vehicle.

3. The onboard ECU according to claim 1, wherein when a request signal transmitted from an external apparatus outside the vehicle is obtained, the control unit refers to the validity information stored in the storage unit, and
   determines whether the inspection program is valid or invalid, based on the validity information.

4. The onboard ECU according to claim 3, wherein an identifier included in the request signal transmitted from the external apparatus is different from an identifier that is used for communication with another onboard ECU installed in the vehicle.

5. The onboard ECU according to claim 1, further comprising:
   an acceptance unit configured to accept access to the storage unit in which the validity information is stored,
   wherein the validity information stored in the storage unit is changed from invalid to valid based on a signal accepted via the acceptance unit.

6. The onboard ECU according to claim 1, wherein the onboard apparatus is an electrical junction box disposed between an electrical storage apparatus and an onboard load that are installed in the vehicle, the electrical junction box includes a relay configured to supply and shut off power from the electrical storage apparatus to the onboard load, and the control unit performs control so as to open and close the relay included in the electrical junction box so as to shut off power supply and provide power supply respectively.

7. The onboard ECU according to claim 1, wherein the control unit that is executing the control program monitors the validity information at a predetermined timing, after the validity information is changed from valid to invalid, and outputs information regarding a result of the monitoring if the validity information indicates that the inspection program is valid.

8. A computer program product comprising a non-transitory, machine-readable medium storing instructions which, when executed by at least one programmable processor, causes at least one programmable processor to perform operations comprising:

referring to a storage unit configured to store a control program for controlling an onboard apparatus, an inspection program for performing an operation check of the onboard apparatus or an onboard Electronic Control Unit ("ECU") for controlling the onboard apparatus, and validity information indicating whether the inspection program is valid or invalid;

executing the inspection program if the validity information indicates that the inspection program is valid; and executing the control program if the validity information indicates that the inspection program is invalid, wherein the storage unit stores a boot program that is executed when the onboard ECU is started, the storage unit includes a first region accessible by a control unit that is executing the control program, and a second region to which access by the control unit that is executing the control program is restricted, the validity information is stored in the second region, the control unit that is executing the boot program accesses the second region using a physical address, the control unit that is executing the control program writes log data of control or drive of the onboard apparatus, in the first region, and a storage capacity of the second region is smaller than a storage capacity of the first region.

9. An information processing method for causing a computer to execute processing for:

referring to a storage unit configured to store a control program for controlling an onboard apparatus, an inspection program for performing an operation check of the onboard apparatus or an onboard Electronic Control Unit ("ECU") for controlling the onboard apparatus, and validity information indicating whether the inspection program is valid or invalid;

executing the inspection program if the validity information indicates that the inspection program is valid; and executing the control program if the validity information indicates that the inspection program is invalid, wherein the storage unit stores a boot program that is executed when the onboard ECU is started, the storage unit includes a first region accessible by a control unit that is executing the control program, and a second region to which access by the control unit that is executing the control program is restricted, the validity information is stored in the second region, the control unit that is executing the boot program accesses the second region using a physical address, the control unit that is executing the control program writes log data of control or drive of the onboard apparatus, in the first region, and a storage capacity of the second region is smaller than a storage capacity of the first region.

* * * * *